W. J. IVES.
Bow-Pins for Ox-Yokes.

No. 145,422.    Patented Dec. 9, 1873.

Witnesses

William J. Ives
Inventor
By Atty.

UNITED STATES PATENT OFFICE.

WILLIAM J. IVES, OF MERIDEN, CONNECTICUT.

IMPROVEMENT IN BOW-PINS FOR OX-YOKES.

Specification forming part of Letters Patent No. 145,422, dated December 9, 1873; application filed September 16, 1873.

*To all whom it may concern:*

Be it known that I, WILLIAM J. IVES, of Meriden, in the county of New Haven and State of Connecticut, have invented a new Improvement in Bow-Pin for Ox-Yokes; and I do hereby declare the following, when taken in connection with the accompanying drawings and the letters of reference marked thereon, to be a full, clear, and exact description of the same, and which said drawings constitute part of this specification, and represent, in—

Figure 1:
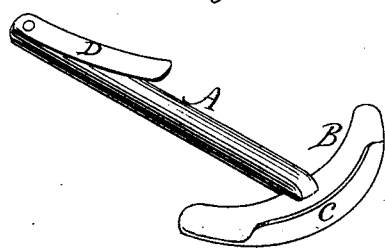
Figure 2:
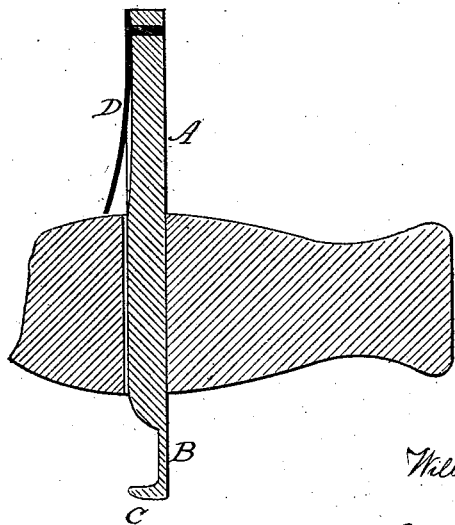

Figure 1, a perspective view of the pin; and in Fig. 2, a section of one arm of the bow with the pin inserted.

This invention relates to an improvement in the pin used for securing the bows into ox-yokes, and for like purposes; and it consists in a spindle provided with a segmental head upon one end, and combined with a latch-spring at the other end, which, while allowing the free passage of the pin through the bow, will, when passed through the bow, rise up upon the opposite side of the bow from which the pin was inserted, and prevent the accidental withdrawal of the pin.

A is the pin, provided at one end with a flat segmental head, B, and this head with a vertical flange, C, by means of which the pin may be conveniently handled. Upon the opposite end of the pin a flat spring, D, is secured, the pin being flattened or a cavity formed therein for the purpose, as seen in Fig. 2, so that the spring adds very little, if any, to the diameter of the pin. This spring extends from the end of the pin toward the bow, so as to leave a space between the spring and the head equal to or a little more than the diameter of the bow. The pin is passed through the yoke in the usual manner, the spring yielding for that purpose, and when passed through the spring will rise from the pin, as seen in Fig. 2, and prevent the accidental withdrawal of the pin.

I do not claim a bow-pin constructed so as to be automatically locked in place when inserted through the bow, as such, I am aware, is not new.

I claim as my invention—

As an article of manufacture, the bow-pin for ox-yokes, consisting of the pin A, having the flanged head B C upon one end, and the spring D on the other, substantially as set forth.

WM. J. IVES.

Witnesses:
 JOHN IVES,
 FRED. PEASE.